United States Patent
Sugaya et al.

(10) Patent No.: US 6,738,786 B2
(45) Date of Patent: May 18, 2004

(54) DATA DISPLAY METHOD AND APPARATUS FOR USE IN TEXT MINING

(75) Inventors: Natsuko Sugaya, Kawasaki (JP); Katsumi Tada, Kawasaki (JP); Yoshifumi Sato, Kawasaki (JP); Tadataka Matsubayashi, Yokohama (JP); Yasuhiko Inaba, Yokohama (JP); Mikihiko Tokunaga, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 09/874,005

(22) Filed: Jun. 6, 2001

(65) Prior Publication Data

US 2002/0116398 A1 Aug. 22, 2002

(30) Foreign Application Priority Data

Feb. 20, 2001 (JP) .................................. 2001-042690

(51) Int. Cl.$^7$ ............................................. G06F 17/30
(52) U.S. Cl. .................................................. 707/104.1
(58) Field of Search .............................. 707/3, 4, 1, 2, 707/102, 104.1, 100; 705/10

(56) References Cited

U.S. PATENT DOCUMENTS

| | | | |
|---|---|---|---|
| 6,006,223 A | * | 12/1999 | Agrawal et al. ............... 707/5 |
| 6,047,299 A | | 4/2000 | Kaijima |
| 6,094,647 A | | 7/2000 | Kato et al. |
| 6,212,532 B1 | * | 4/2001 | Johnson et al. ............... 707/3 |
| 6,388,592 B1 | * | 5/2002 | Natarajan ................... 341/107 |
| 6,446,061 B1 | * | 9/2002 | Doerre et al. ............... 707/101 |
| 6,510,406 B1 | * | 1/2003 | Marchisio ..................... 707/3 |

* cited by examiner

*Primary Examiner*—Safet Metjahic
*Assistant Examiner*—Sana Al Hashemi
(74) *Attorney, Agent, or Firm*—Mattingly, Stanger & Malur, P.C.

(57) ABSTRACT

In a text mining technique, if the system only extracts characteristic words and phrases frequently cooccurring with the respective components of an analysis axis as an analysis condition, similar words and phrases are extracted for any component. To clearly indicate existence of characteristic words and phrases which do not appear as cooccurrence words and phrases for other components of the analysis axis, it is desired to appropriately present distinguishable features between the components to the user. For this purpose, the frequency of appearances of a plurality of characteristic words and phrases in a document satisfying each analysis condition is calculated. As a result, multiple cooccurrence words and phrases and component-cooccurrence words and phrases are discriminatively displayed. It is therefore possible for the user to appropriately analyze the contents of a plurality of documents.

23 Claims, 12 Drawing Sheets

FIG.4

| | JULY | AUGUST | SEPTEMBER | OCTOBER | NOVEMBER | DECEMBER |
|---|---|---|---|---|---|---|
| 1 | DISEASE-CAUSING COLON BACILLUS | DISEASE-CAUSING COLON BACILLUS | DISEASE-CAUSING COLON BACILLUS | DISEASE-CAUSING COLON BACILLUS | DISEASE-CAUSING COLON BACILLUS | DISEASE-CAUSING COLON BACILLUS |
| 2 | FOOD POISONING | INFECTION | FOOD POISONING | INFECTION | INFECTION | FOOD POISONING |
| 3 | INFECTION | FOOD POISONING | MEASURE | FOODS | GROUP | GROUP |
| 4 | MEASURE | MEASURE | GROUP | REDUCTION | FOOD POISONING | INFECTION |
| 5 | HYGIENE | GROUP | INFECTION | GROUP | PROVISION OF MEALS | MEASURE |
| 6 | GROUP | HYGIENE | GROUP FOOD POISONING | FOOD POISONING | SCHOOL | PROVISION OF MEALS |
| 7 | PATIENT | CITY OF SAKAI | SCHOOL | SCHOOL | PUBLIC HEALTH CENTER | GROUP FOOD POISONING |
| 8 | GROUP FOOD POISONING | DETECTION | CITY OF SAKAI | SALES AMOUNT | PATIENT | CITY OF SAKAI |
| 9 | SYMPTOM | INSPECTION | PROVISION OF MEALS | RETAIL | GROUP FOOD POISONING | OSAKA PREFECTURE |
| 10 | DETECTION | FOODS | OSAKA PREFECTURE | DETECTION | MEASURE | CAUSE |

FIG.5

| | JULY | AUGUST | SEPTEMBER | OCTOBER | NOVEMBER | DECEMBER |
|---|---|---|---|---|---|---|
| 1 | DISEASE-CAUSING COLON BACILLUS | DISEASE-CAUSING COLON BACILLUS | DISEASE-CAUSING COLON BACILLUS | DISEASE-CAUSING COLON BACILLUS | DISEASE-CAUSING COLON BACILLUS | DISEASE-CAUSING COLON BACILLUS |
| 2 | FOOD POISONING | INFECTION | FOOD POISONING | INFECTION | INFECTION | FOOD POISONING |
| 3 | INFECTION | FOOD POISONING | MEASURE | FOODS | GROUP | GROUP |
| 4 | MEASURE | MEASURE | GROUP | REDUCTION | FOOD POISONING | INFECTION |
| 5 | HYGIENE | HYGIENE | INFECTION | GROUP | PROVISION OF MEALS | MEASURE |
| 6 | GROUP | CITY OF SAKAI | GROUP FOOD POISONING | FOOD POISONING | SCHOOL | PROVISION OF MEALS |
| 7 | PATIENT | DETECTION | SCHOOL | SCHOOL | PUBLIC HEALTH CENTER | GROUP FOOD POISONING |
| 8 | GROUP FOOD POISONING | INSPECTION | CITY OF SAKAI | SALES AMOUNT | PATIENT | CITY OF SAKAI |
| 9 | SYMPTOM | FOODS | PROVISION OF MEALS | RETAIL | GROUP FOOD POISONING | OSAKA PREFECTURE |
| 10 | DETECTION | FOODS | OSAKA PREFECTURE | DETECTION | MEASURE | CAUSE |

MULTIPLE COOCCURRENCE WORDS AND PHRASES

DISEASE-CAUSING COLON BACILLUS
FOOD POISONING
INFECTION
GROUP
----

FIG.6

MULTIPLE COOCCURRENCE WORDS AND PHRASES

| | SIMILAR TOPICS | IMPORTANCE |
|---|---|---|
| 1 | DISEASE-CAUSING COLON BACILLUS | 100% |
| 2 | FOOD POISONING | 100% |
| 3 | INFECTION | 100% |
| 4 | GROUP | 100% |
| 5 | MEASURE | 83% |
| 6 | GROUP FOOD POISONING | 67% |
| ⋅ | ⋅ | ⋅ |
| ⋅ | ⋅ | ⋅ |

TOPICS FOR EACH COMPONENT

| | JULY | AUGUST | SEPTEMBER | OCTOBER | NOVEMBER | DECEMBER |
|---|---|---|---|---|---|---|
| 1 | HYGIENE | HYGIENE | SCHOOL | FOODS | PROVISION OF MEALS | PROVISION OF MEALS |
| 2 | PATIENT | CITY OF SAKAI | CITY OF SAKAI | REDUCTION | SCHOOL | CITY OF SAKAI |
| 3 | REDUCTION | DETECTION | PROVISION OF MEALS | SCHOOL | PUBLIC HEALTH CENTER | OSAKA PREFECTURE |
| 4 | DETECTION | INSPECTION | OSAKA PREFECTURE | SALES AMOUNT | PATIENT | CAUSE |
| 5 | OSAKA PREFECTURE | FOODS | FOODS | RETAIL | GROUP INFECTION | STAFF |
| 6 | OCCURRENCE | OSAKA PREFECTURE | DETECTION | DETECTION | KINDERGARTEN | SPECIAL |
| 7 | SAME CITY | DEALERS CONCERNED | HYGIENE | RECOVERY | ONE PERSON | SCHOOL MEALS PROVISION |
| 8 | INSPECTION | DAMAGE | CHILDREN | OCCURRENCE | SCHOOL MEALS PROVISION | 16 DAYS |
| 9 | MEASURE CENTER | PATIENT | DEALERS CONCERNED | MINUS | DAMAGE | RECOVERY |
| 10 | HOSPITALIZATION | REDUCTION | IN THE CITY | EATING AND DRINKING | OCCURRENCE | HOSPITALIZATION |

DATA DISPLAY METHOD AND APPARATUS FOR USE IN TEXT MINING

BACKGROUND OF THE INVENTION

The present invention relates to a data display method and a data display apparatus in which various data is acquired, from a data base of documents beforehand registered thereto, for a set of specified documents and the acquired data is displayed.

With recent development of word processors, personal computers, and the like, the amount of electronic information generated by such word processors and personal computers are increasing. Moreover, the amount of electronic information available via worldwide web (WWW), e-mail, newswire, and the like are rapidly increasing. In firms and companies, it is quite important to analyze the contents of such electronic information for efficient use thereof.

In general, most electronic information is described in texts, that is, in a format of statements. The text information, for example, the contents of a questionnaire of free answer type cannot be easily analyzed by computers or the like and hence have been heretofore analyzed by human power. However, the information analysis by human power is attended with problems as follows. (1) The pertinent person in charge of analysis must read all documents for the processing. Therefore, when the amount of documents is largely increased, this method is not practical. (2) The information analysis is carried out according to subjective judgement of the user. Therefore, the results of information analysis vary depending on knowledge and skill of the user.

Therefore, an increasing need exists for a text mining technique as a technique to support the information analysis by human power. Agrawal et al U.S. Pat. No. 6,006,223 entitled "Mapping Words, Phrases Using Sequential-Pattern To Find User Specific Trends In a Text Database" issued on Dec. 21, 1999 concretely describes a processing procedure of text mining. This will be referred to as prior art 1 herebelow. In the text mining, a search or retrieval is made through text information beforehand registered to detect new knowledge according to, for example, or coincidence of words and phrases, a tendency of occurrence of words and phrases contained in the information to be processed. Specifically, for a set of processing objective documents, an analysis axis representing points of view for analysis is set to acquire words and phrases representing features or characteristics of a set of documents according to a correspondence to constituent components of the analysis axis. In this expression, "to acquire words and phrases according to a correspondence to constituent components of the analysis axis" means, for example, "to acquire words and phrases which cooccur in a predetermined range with constituent components of the analysis axis." By referring to the words and phrases, the user can recognize a tendency of a set of documents. FIG. 2 shows an example of analysis in which a set of news items of "0157" in newspapers are analyzed using "the month of report or publication of the pertinent news item" as the analysis axis. That is, the analysis condition is expressed as "news item reported in 'July'", "news item reported in 'August'", and the like. In the analysis using the publication month as the analysis axis, words "infection, patient, symptom, hospitalization, etc." are acquired in association with "July" as a component of the analysis axis; words "damage, provision of means, hospitalization, group infection, etc." are acquired in association with "August" as a component of the analysis axis; words "sales amount, minus, foods, perishable, etc." are acquired in association with "September" as a component of the analysis axis; and so on. By referring to the words, the user can obtain a tendency that the set of documents contains topics: "Patients infected with "0157 disease-causing bacteria" are hospitalized" in "July", "Group infection with "0157 bacteria" through provision of meals" in "August", and "Sales amount of perishable foods and the like lowered due to influence of 0157".

FIG. 3 shows an example of a processing procedure of prior art 1 in a problem analysis diagram (PAD). In step 300, a set of documents is specified as an object of the text mining. In a case of a questionnaire in which a pertinent document database contains documents collected according to predetermined points of view, the database is directly specified as an objective document set. In a case of items of newspapers in which the database contains documents gathered according to various points of view such as politics, economy, sports, and the like, a full text search is conducted according to an analysis purpose of the user to specify a set of documents. "A full text search" is a technique in which all texts of the documents as the processing objects are inputted to a pertinent computer system to thereby generate a database in a registration stage. In a retrieval stage, in response to a character string specified by the user, all documents containing the character string are retrieved from the database. For example, Kato et al U.S. Pat. No. 6,094,647 entitled "Presearch Type Document Search Method and Apparatus" assigned to the present assignee describes the full text search in detail. This technique will be referred to as prior art 2 herebelow. In step 301, characteristic words and phrases, namely, words and phrases which characterize the contents are extracted from the set of documents specified in step 300. The characteristic words and phrases may be extracted by referring to a dictionary or by using statistical information. The characteristic words and phrases are not limited to words. For example, when the dictionary contains a complex word including two or more words, for example, "disease-causing colon bacillus", the characteristic words and phrases extracted in step 301 may include tow or more words. Conversely, the characteristic words and phrases to be extracted may be limited to a word. In step 302, an analysis axis is set as points of view for the analysis. In this example, "date", "age", "sex", and the like assigned as bibliographical information items of a document are specified as the analysis axis or words and phrases specified by the user are set as constituent components of the analysis axis. For example, when it is desired to acquire difference of awareness or consciousness by age from a questionnaire, the age is set as the analysis axis. In this situation, values representing ages such as "20" and "30" are specified as components of the analysis axis. Finally, in step 303, processing of step 304 is repeatedly executed for the components of the analysis axis set in step 302. In step 304, a search is made through the characteristic words and phrases extracted in step 301 to extract words and phrases strongly related to the components of the analysis axis, for example, a cooccurrence word/phrase which cooccurs in a predetermined range. The predetermined range is specified, for example, "within one document", "within one paragraph", "within one sentence" or "within m or n words (m and n are integers)." In prior art 1, words and phrases are obtained by establishing correspondence to the components of the analysis axis to thereby help the user recognize a tendency of the set of documents. As above, since the words and phrases characterizing the pertinent set of documents are automatically obtained by establishing correspondence to the components of the analysis axis in prior art 1, the load imposed on the user can be reduced and the difference in the analysis results between users can be minimized.

SUMMARY OF THE INVENTION

According to prior art 1, the words and phrases characterizing the pertinent set of documents are automatically obtained by establishing correspondence to the components of the analysis axis. Therefore, it is possibly to minimize the load imposed on the user described above, and the fluctuation or dispersion of the analysis resultant from respective knowledge and skill of users can be minimized.

However, prior art 1 is attended with a problem as below. As can be seen from an analysis example of FIG. 4, when the words and phrases with a high frequency of cooccurrence with each component of the analysis axis are simply extracted from the set of documents, the same words and phrases italicized in FIG. 4 such as "disease-causing colon bacillus", "food poisoning", "infection" and "group" are extracted for any component. That is, cooccurrence words and phrases such as "patient" and "symptom" of "July" and "inspection" and "foods" of "August" which rarely appears for other components of the analysis axis are ignored. It is therefore not possible to appropriately present a different point with respect to meaning between the components of the analysis axis to the user.

It is therefore an object of the present invention to provide a data display method and a data display apparatus in which the user can suitably analyze the contents of a plurality of documents.

According to one aspect of the present invention, a frequency of appearances of a plurality of words and phrases in a document satisfying each analysis condition is calculated and the words and phrases are displayed according to a result of the calculation.

Another object of the present invention is to provide a document processing system which supports a text mining function to clarify similar points and different points of words and phrases cooccurring, or occurring together, with each component of an analysis axis so that the user can appropriately analyze a tendency of a set of the documents.

To achieve the objects according to one aspect of the present invention, there is provided a text mining method including a characteristic words and phrases extraction step of collecting, from a set of documents beforehand registered, all of or part of the documents into a set of processing objective documents and of extracting therefrom words and phrases characteristically appearing therein, a mining scheme creation step of setting definition information or a mining scheme containing components specified, a cooccurrence words and phrases acquisition step of acquiring, from the words and phrases extracted by the characteristic words and phrases extraction step, cooccurrence words and phrases cooccurring in a predetermined range with each component contained in the mining scheme, and a multiple cooccurrence words and phrases extraction step of comparing cooccurrence words and phrases between the elements or components contained in the mining scheme, of acquiring, as multiple cooccurrence words and phrases, cooccurrence words and phrases related to many components contained in the mining scheme, and creating component-cooccurrence words and phrases by removing the multiple cooccurrence words and phrases from the cooccurrence words and phrases of the respective components.

BRIEF DESCRIPTION OF THE DRAWINGS

The objects, features and advantages of the present invention will become more apparent from the following detailed description of the embodiments of the invention when taken in conjunction with the accompanying drawings in which:

FIG. 4 a schematic diagram for explaining a problem of prior art 1;

FIG. 5 is a diagram exemplifying the contents of processing of multiple occurrence words and phrase extraction of the present invention;

FIG. 6 is a diagram showing a display format of words and phrases extracted from a retrieval objective document according to an embodiment of the present invention;

DETAILED DESCRIPTION OF THE EMBODIMENTS

Figure 1:
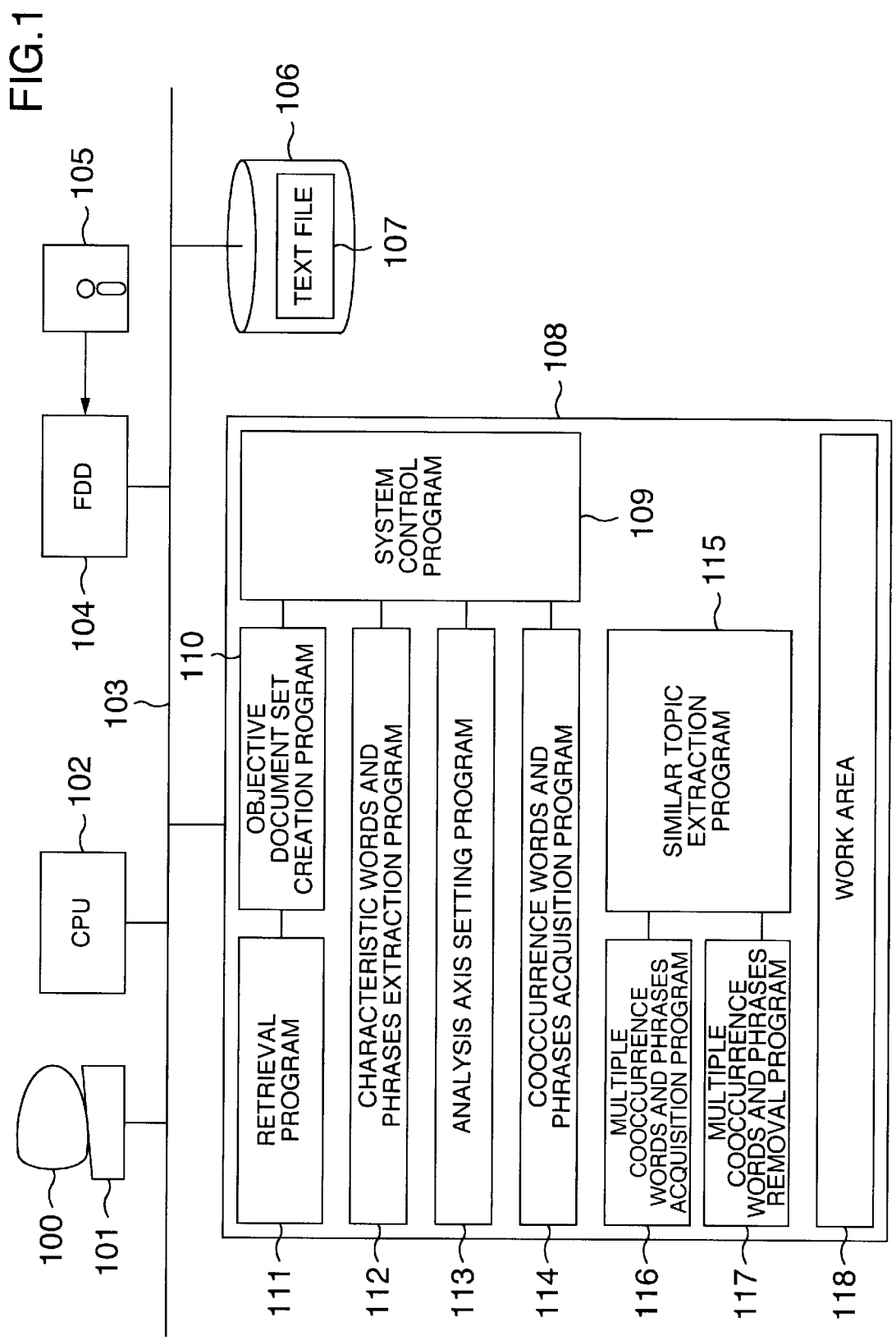
FIG. 1 is a schematic block diagram showing structure of an embodiment according to the present invention.
Figure 2:
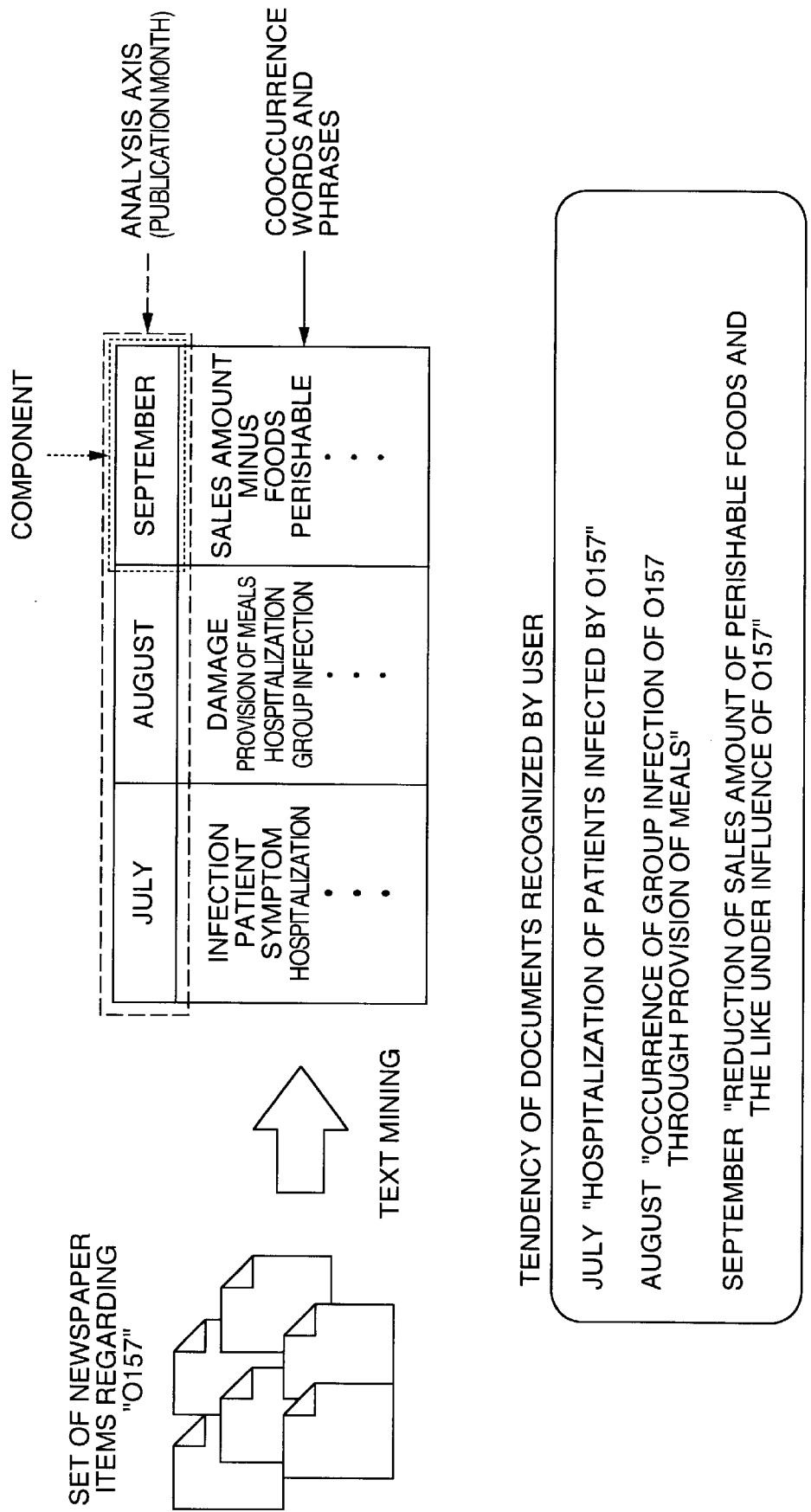
FIG. 2 is a schematic diagram for explaining prior art 1.
Figure 3:
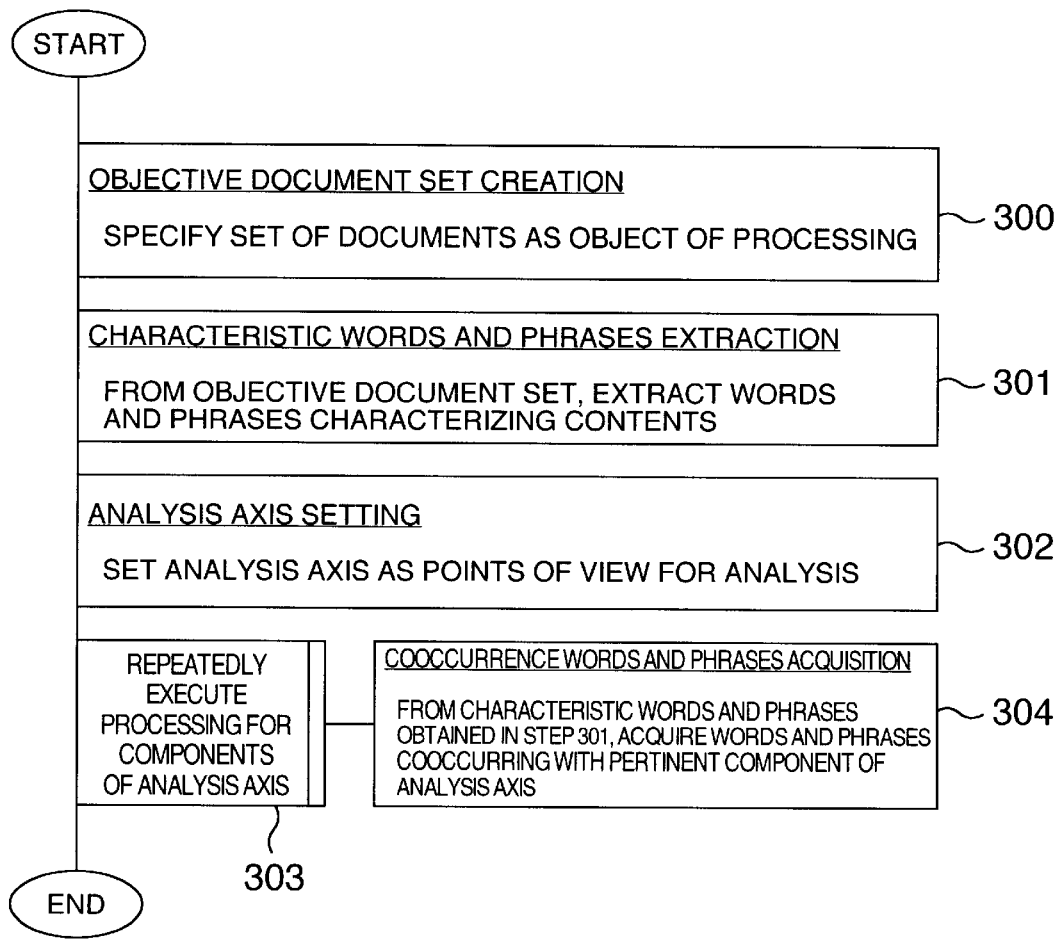
FIG. 3 is a PAD showing the contents of processing of prior art 1.

Prior to explanation of an embodiment of the present invention, description will be given of the principle of the present invention using the document retrieval method. When a text mining execution indication is inputted, a set of documents as an object of the text mining is accessed to extract therefrom characteristic words and phrases characterizing the contents to obtain, from the extracted characteristic words and phrases, words and phrases strongly or deeply related to components of a specified analysis axis, for example, cooccurrence words and phrases cooccurring in a predetermined range. The contents of the processing are similar to those of prior art 1. As a result, cooccurrence words and phrases can be obtained for the respective components of the analysis axis as shown in FIG. 4. In the present invention, the cooccurrence words and phrases are compared between the components of the analysis axis to acquire, as multiple cooccurrence words and phrases, words and phrases related to many components. By removing the multiple cooccurrence words and phrases from the cooccurrence words and phrases of the respective components, component-cooccurrence words and phrases are created.

A concrete example of the processing will be described by referring to FIGS. 5 and 6. First, cooccurrence words and phrases related to many components of the analysis axis are obtained as multiple cooccurrence words and phrases. In the example shown in FIG. 5, "disease-causing colon bacillus", "food poisoning", "infection", "group", etc. are obtained as cooccurrence words and phrases for the most components. These words and phrases are obtained as multiple cooccurrence words and phrases. In the example of this diagram, although the words and phrases as the cooccurrence words and phrases of many components are simply obtained as multiple cooccurrence words and phrases, weighting may be conducted according to a sequence of cooccurrence words and phrases and/or strength of cooccurrence of the pertinent words and phrases. The strength of cooccurrence is indicated by a value calculated according to the number of cooccurrences between the respective components and the pertinent word/phrase or between other components and the pertinent word/phrase. For example, a characteristic word/phrase which rarely cooccurs with other components, but cooccurs many times with the pertinent component has greater strength of cooccurrence with the pertinent component. Next, elemental cooccurrence words and phrases or component-cooccurrence words and phrases are created by removing the multiple cooccurrence words and phrases from the cooccurrence words and phrases of the respective components. In the example shown in FIG. 5, the multiple cooccurrence words and phrases (italicized in the diagram) such as "disease-causing colon bacillus", "food poisoning", "infection", "group", etc. are removed from the cooccurrence words and phrases of the respective components to create component-cooccurrence words and phrases. To display results of the processing to the user, the multiple cooccurrence words and phrases may be presented as similar topics of components of the analysis axis and the component-cooccurrence words and phrases are presented as topics of the respective components, for example, as shown in FIG. 6. In this diagram, each of the values displayed as importance indicate a degree of relationship to components, namely, the number of components to which the pertinent word/phrase is related. Moreover, if the restriction of the cooccurrence words and phrases to be obtained as multiple cooccurrence words and phrases is relaxed to extract cooccurrence words and phrases with a lower degree of importance as the multiple cooccurrence words and phrases, cooccurrence words and phrases unique to the respective components can be obtained as component-cooccurrence words and phrases. Therefore, it is possible to present topics unique to the respective components.

In this method described above, the cooccurrence words and phrases are compared between the components of the analysis axis such that cooccurrence words and phrases related to many components are obtained as multiple cooccurrence words and phrases. The component-cooccurrence words and phrases are created by removing the multiple cooccurrence words and phrases from the cooccurrence words and phrases of the respective components. Resultantly, it is possible to clarify the similar points of the respective components of the analysis axis as the multiple cooccurrence words and phrases and the differences therebetween as component-cooccurrence words and phrases. Therefore, it is possible to provide a document processing system in which the user can appropriately analyze a tendency of a set of documents.

Figure 7:
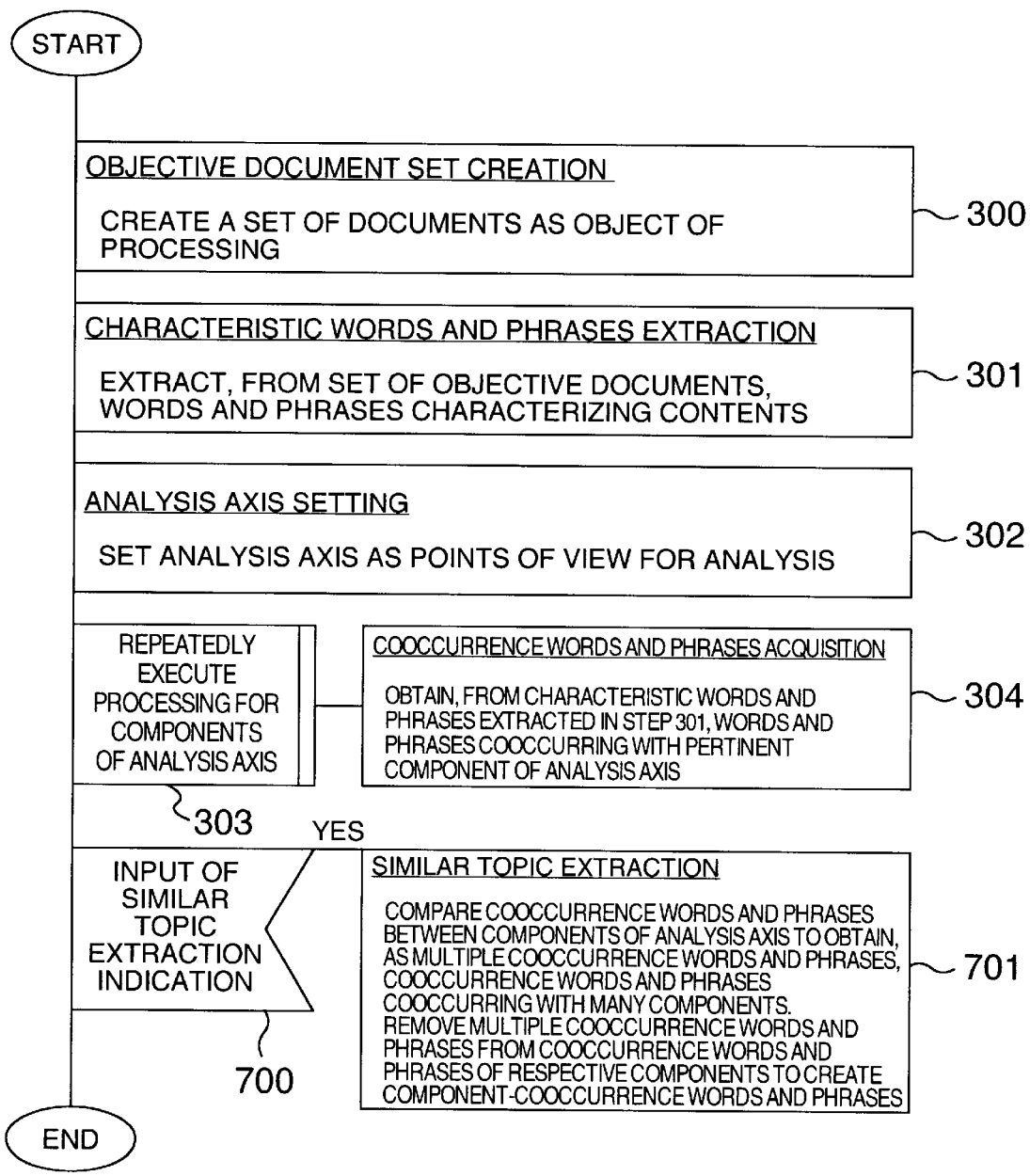
FIG. 7 is a PAD showing steps to generate a set of multiple cooccurrence words and phrases and a set of component-cooccurrence words and phrases according to an embodiment of the present invention.

The principle of the present invention will be described by referring to the PAD shown in FIG. 7. When an indication of text mining execution is inputted, a set of documents as an object of the text mining is specified in step 300. In step 301, characteristic words and phrases characterizing the contents are extracted from the set of documents specified in step 300. In step 302, an analysis axis is set as points of view for the analysis. In step 303, processing of step 304 is repeatedly executed for each component of the analysis axis set in step 302. In step 304, the characteristic words and phrases extracted in step 301 is accessed to obtain therefrom words and phrases strongly related to the pertinent component of the analysis axis, for example, cooccurrence words and phrases cooccurring in a predetermined range. The contents of processing from step 300 to step 304 are similar to those of prior art 1. As a result, cooccurrence words and phrases corresponding to the respective components of the analysis axis can be obtained as shown in FIG. 4. Moreover, according to the present invention, the cooccurrence words and phrases are compared between the components of the analysis axis and cooccurrence words and phrases related to many components are obtained as multiple cooccurrence words and phrases. Thereafter, component-cooccurrence words and phrases are created by removing the multiple cooccurrence words and phrases from the cooccurrence words and phrases of the respective components. According to the present invention, when an indication of similar topic extraction is inputted in step 700, the cooccurrence words and phrases related to many components of the analysis axis are obtained as multiple cooccurrence words and phrases.

Description will now be given of an embodiment of the present invention by referring to the accompanying drawings.

FIG. 1 shows constitution of a document processing system according to an embodiment of the present invention in a block diagram. The document system-according to the present invention includes as shown in FIG. 1, a display 100, a keyboard 101, a central processing unit (CPU) 102, a floppy disk drive (FDD) 104, a magnetic disk device 106, a main memory 108, and a bus 103 connecting the constituent components to each other. The magnetic disk device 106 is a secondary storage to store a text file 107. Information stored in the floppy disk 105 is accessed by the floppy disk drive 104. The floppy disk drive 104 and the magnetic disk device 106 may be configured to be connected to other devices connected, for example, via a communication line, not shown in FIG. 1, to each other.

Stored in the main storage 108 are a system control program 109, an objective document set creation program 110, a retrieval program 111, a characteristic words and phrases extraction program 112, an analysis axis setting program 113, a cooccurrence words and phrases acquisition program 114, a similar topic extraction program 115, a multiple cooccurrence words and phrases acquisition program 116, and a multiple cooccurrence words and phrases removal program 117. Additionally, a work area 118 is reserved in the main storage 108. These programs may be stored on a computer-readable recording medium such as a magnetic disk 106 or a floppy disk 105.

Description will next be given of the processing executed by the embodiment of the present invention by referring to FIG. 8. When a text mining execution indication from the keyboard 101, a function call from another program, or the like is received, the system control program 109 starts its operation to control the objective document set creation program 110, the characteristic words and phrases extraction program 112, the analysis axis setting program 113, the cooccurrence words and phrases acquisition program 114, and the similar topic extraction program 115.

In step 800, the system control program 109 initiates the document set creation program 110 to access the text file 107 to accordingly create a set of documents as an object of the processing. When the text file 107 is a document database of documents collected according to predetermined points of view, for example, of a questionnaire, the document database may be directly set as the objective document set. Alternatively, when the text file 107 is a document database of documents of, for example, newspapers and documents are gathered according to various points of view such as politics, economy, sports, and the like, a full text search may be conducted according to an analysis purpose of the user to specify a set of documents. When the full text search or the like is used to create the objective document set, the objective document set creation program 110 initiates the retrieval program 111 to make a retrieval operation through the text file 107 using a specified retrieval condition. As a result, a set of documents thus retrieved is created as the objective document set. The retrieval program 111 includes an existing retrieval technique like that of prior art 2. In step 801, the document set creation program 110 initiates the characteristic words and phrases extraction program 112 to extract, from the objective document set created in step 800, characteristic words and phrases characterizing the pertinent contents. The characteristic words and phrases may be extracted by referring to, for example, a dictionary or by using statistical information. Furthermore, words/phrases having the same meaning may be collected using a thesaurus or the like to be replaced with one word/phrase. The characteristic words and phrases to be extracted are not limited to words. For example, when the dictionary includes a complex word including two or more words, the characteristic word/phrase extracted in this step may include two or more words. Conversely, the characteristic word/phrase to be extracted may be limited to one word.

In step 802, the program 110 initiates the analysis axis setting program 113 to set an analysis axis as points of view for the analysis. In this case, "date", "age", "sex", and the like assigned as bibliographical information of a document are specified as the analysis axis or words and phrases specified by the user are set as components of the analysis axis. For example, to acquire difference of awareness or consciousness by age from a questionnaire, the age is set as the analysis axis. In this situation, values representing ages such as "20" and "30" are specified as components of the analysis axis. In step 803, the program 110 initiates the cooccurrence words and phrases acquisition program 114 to repeatedly execute processing of step 804 for the components of the analysis axis set in step 802.

In step 804, from the characteristic words and phrases extracted in step 801, words and phrases strongly related to the components of the analysis axis are obtained. For example, when "age", "sex", and the like assigned as bibliographic information items are specified as components of the analysis axis, characteristic words and phrases extracted from documents to which the pertinent bibliographic information is assigned are obtained as words and phrases strongly related to the bibliographic information. For example, when "age" is set as an analysis axis in the example of the questionnaire, characteristic words and phrases extracted from a document to which "age is 20" is assigned are obtained as words and phrases strongly related to the component "20".

When a specified word/phrase is set as a component of the analysis axis, cooccurrence words and phrases cooccurring with the specified word/phrase are acquired, for example, within a predetermined range. The predetermined range is specified, for example, "within one document", "within one paragraph", "within one sentence", or "within m or n words (m and n are integers)." The processing from step 800 to step 804 is similar to that of prior art 1. In this embodiment, when the similar topic extraction indication is received from the keyboard 101 or when a function call is received from another program in step 805, the similar topic extraction program 115 is initiated in step 806 to conduct similar topic extraction.

Figure 9:
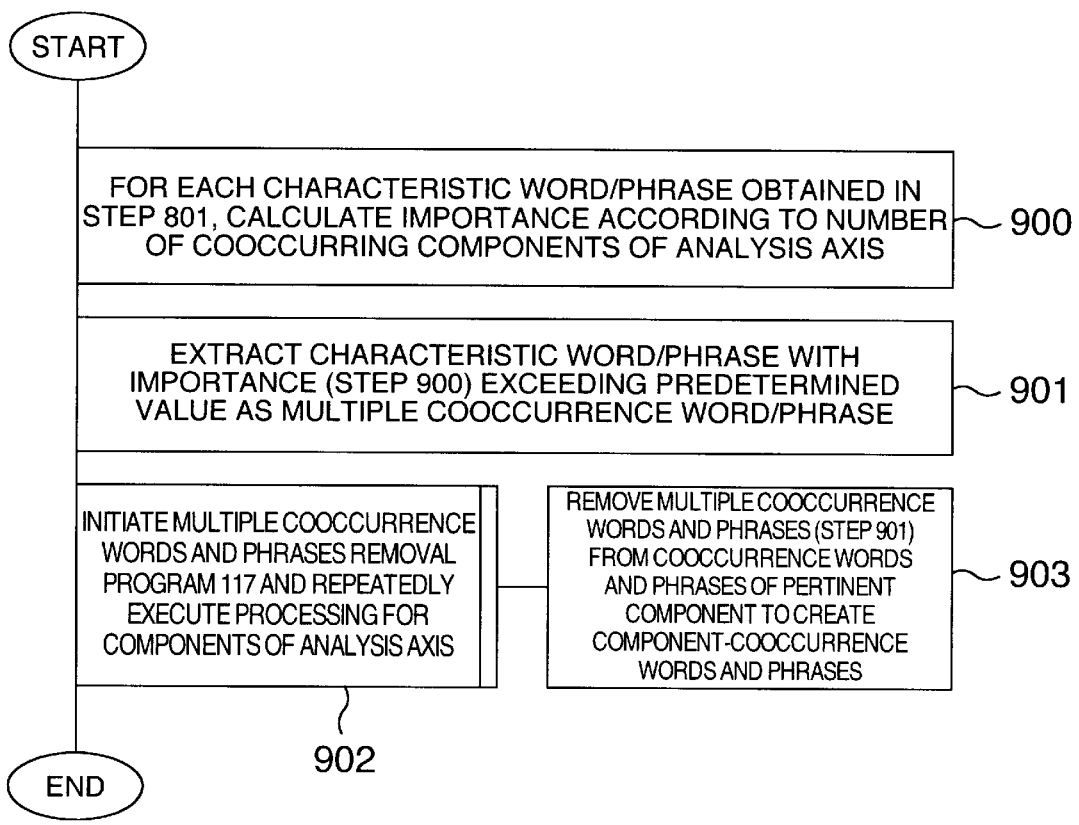
FIG. 9 is a PAD showing steps to create (a set of) component-cooccurrence words and phrases in an embodiment of the present invention.

FIG. 9 shows the processing of the similar topic extraction by the similar topic extraction program 115. In step 900, for each characteristic word/phrase obtained in step 801, a degree of importance is calculated according to the number of cooccurrence components of the analysis axis. In step 901, any characteristic word/phrase having a degree of importance (step 900) exceeding a predetermined value is extracted as a multiple cooccurrence word/phrase. In step 902, the multiple cooccurrence words and phrases removal program 117 is initiated to repeatedly execute processing of step 903 for the components of the analysis axis. In step 903, component-cooccurrence words and phrases are created by removing the multiple cooccurrence words and phrases obtained in step 901 from the cooccurrence words and phrases of the pertinent component.

Figure 8:
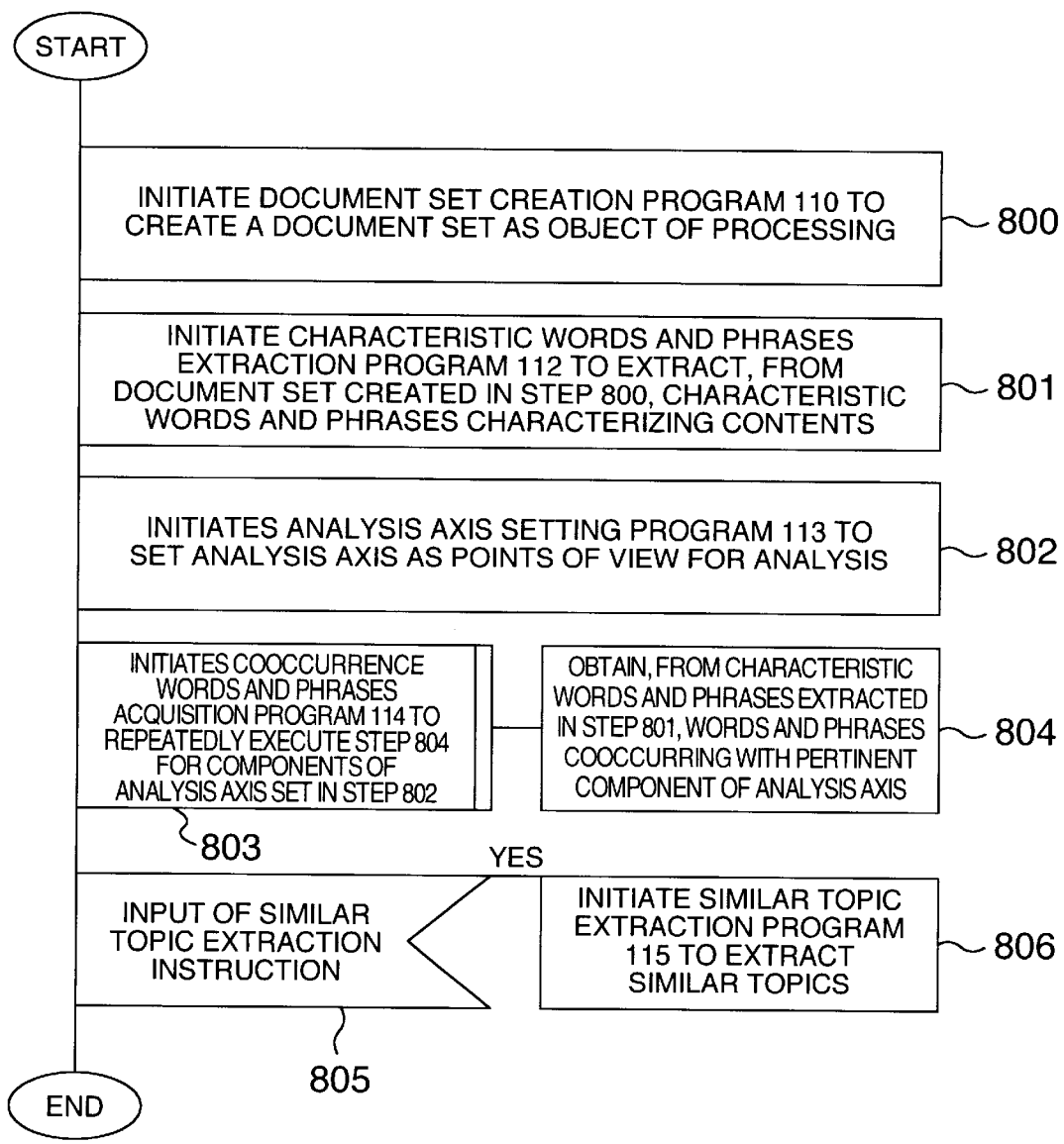
FIG. 8 is a PAD showing the contents of processing of a similar topic extraction process in an embodiment of the present invention.

Referring now to FIG. 8, description will be given in detail of the processing of this embodiment. In step 800, the system control program 109 initiates the document set creation program 110 in which documents as an object of the processing are selected form the text file 107 to be collected as a document set for the processing. When the text file 107 is a document database including documents collected according to beforehand determined points of view, for example, of a questionnaire, the document database may be set as the objective document set. Conversely, when the text file 107 is a document database of documents of, for example, newspapers and documents are gathered according to various points of view such as politics, economy, sports, and the like, a full text search may be conducted according to an analysis purpose of the user to select documents to thereby create a set of documents. When the full text search or the like is used to create the objective document set, the objective document set creation program 110 initiates the retrieval program 111 to make a retrieval through the text file 107 using a specified retrieval condition. As a result, a set of documents thus retrieved is created as the objective document set. For the retrieval program 111, an existing retrieval technique like that of prior art 2 is employed.

Figure 10:
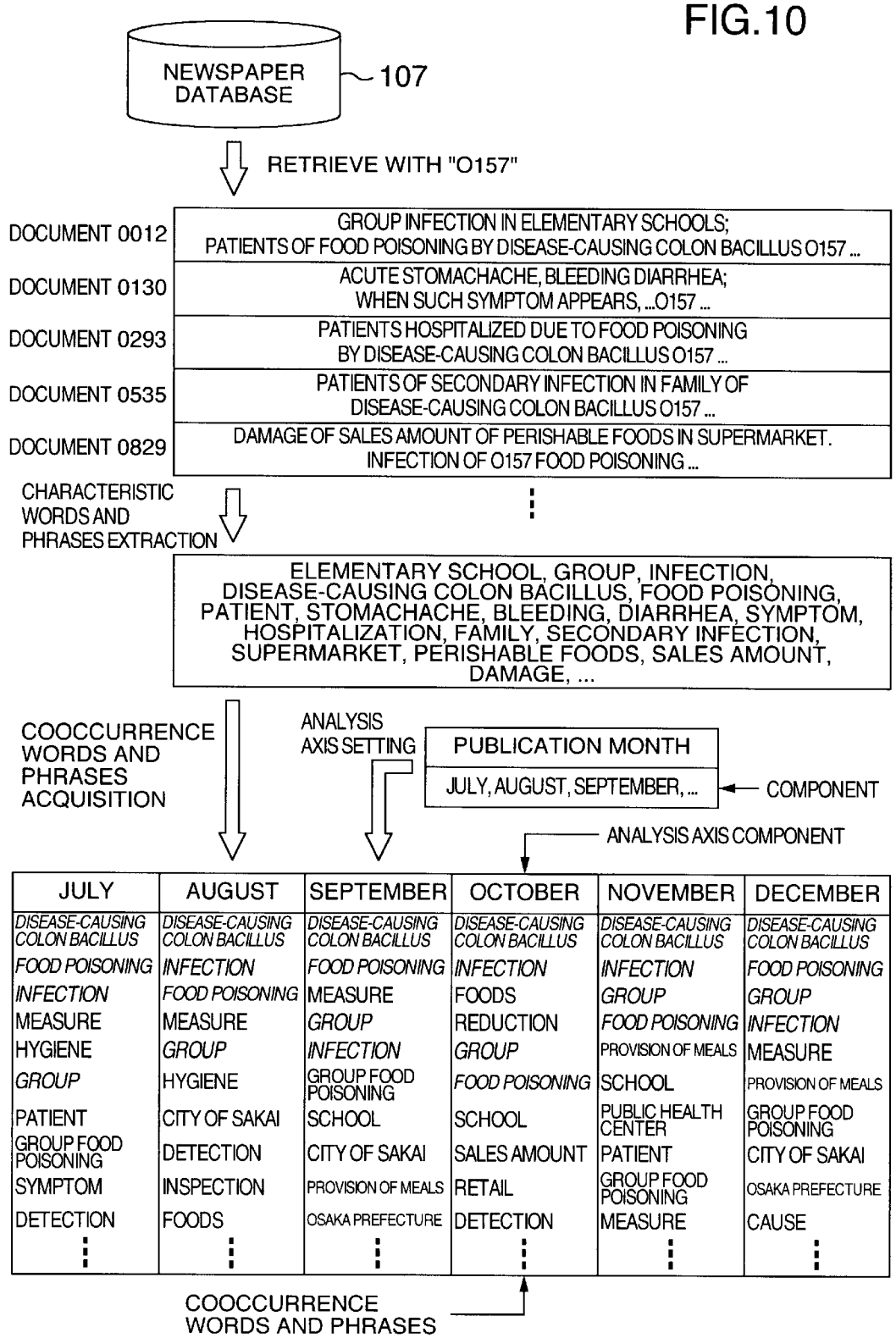
FIG. 10 is a process diagram showing the contents of processing to analyze document extraction characteristic words and phrases in an embodiment of the present invention.

FIG. 10 shows an example of text mining for news items regarding the "0157 disease-causing bacteria" in a newspaper database. In this example shown in FIG. 10, a newspaper database is stored in the text file 107 in advance. By executing the retrieval program 111, the pertinent database is limited to contain only news items including "0157" to obtain processing objective document set including document 0012, document 0130, document 0293, document 0535, document 0829, etc. If the objective documents are structured documents, the documents may be limited such that each document contains "0157" in any structure.

In step 801, the characteristic words and phrases extraction program 112 is initiated to extract, from the objective document set created in step 800, characteristic words and phrases characterizing the contents. The characteristic words and phrases may be extracted by referring to, for example, a dictionary or by using statistical information. Furthermore, words/phrases having the same meaning may be collected using a thesaurus or the like to be replaced with one word/phrase. U.S. Pat. No. 6,047,299 issued on Apr. 4, 2000 (Kaijima) proposes an example of the thesaurus such as an electronic terminology dictionary used for the support of editing and translation of a document. The characteristic words and phrases to be extracted are not limited to words. For example, when a complex word including two or more words is contained in the dictionary, the characteristic word/phrase extracted in this step may include two or more words. Conversely, the characteristic word/phrase to be extracted may be limited to one word. In the example of FIG. 10, from the objective document set created in step 800, there are extracted characteristic words and phrases "elementary school, group, infection, disease-causing colon bacillus, food poisoning, patient, stomachache, bleeding, diarrhea, symptom, hospitalization, family, secondary infection, supermarket, perishable foods, sales amount, damage, ...".

In step 802, the analysis axis setting program 113 is initiated to set an analysis axis as points of view for the analysis. In this case, "date", "age", "sex", and the like assigned as bibliographical information items of a document are specified as the analysis axis or words and phrases specified by the user are set as components of the analysis axis. In the example shown in FIG. 10, "news items published in 'July'", "news items published in 'August'", etc. are specified as analysis conditions. In step 803, the cooccurrence words and phrases acquisition program 114 is initiated to repeatedly execute processing of step 804 for the components of the analysis axis specified in step 802.

In step 804, from the characteristic words and phrases extracted in step 801, words and phrases strongly related to the pertinent component of the analysis axis are obtained. In the example of FIG. 10, a bibliographic information item of newspaper, i.e., the month in which items are published is set as the component of the analysis axis. Therefore, "disease-causing colon bacillus, food poisoning, infection, measures, hygiene, ..." are extracted as words and phrases strongly related to the component of the analysis axis, i.e., "July" from the newspaper items published in "July". In the display method of the words and phrases, the words and phrases may be sorted in a sequence of frequency of appearances thereof in the newspaper items published in "July" to be displayed as the words and phrases deeply related to "July". Alternatively, the words and phrases may be sorted in an ascending sequence of frequency of appearances in the overall database such that the words and phrases less frequently appear in the database are distinguishably displayed in the starting part of the list.

That is, the items above means that the words and phrases "disease-causing colon bacillus, food poisoning, infection, measures, hygiene, ..." frequently appear in the newspaper items published in "July". Similarly, as the words and phrases deeply related to "August", "disease-causing colon bacillus, infection, food poisoning, measures, group, ..." are obtained from the newspaper items published in "August". Additionally, as the words and phrases deeply related to "September", "disease-causing colon bacillus, food poisoning, measures, group, infection ..." are obtained from the newspaper items published in "September". The processing from step 800 to step 804 is similar to that of prior art 1.

In this embodiment, when the similar topic extraction indication is received from the keyboard 101 or when a function call is received from another program in step 805, the similar topic extraction program 115 is initiated in step 806 to conduct similar topic extraction. Referring next to FIG. 9, description will be given in detail of the similar topic extraction.

In step 900, for each characteristic word/phrase obtained in step 801, the similar topic extraction program 115 calculates a degree of importance according to the number of cooccurrence components of the analysis axis.

It can be understood from the example of FIG. 10, for the characteristic word/phrase "disease-causing colon bacillus", cooccurrence takes place for all of the six components of the analysis axis. Therefore, the degree of importance is calculated as, for example, 6/6×100=100%. Furthermore, for the characteristic word/phrase "group food poisoning", cooccurrence takes place for four components of the analysis axis. Therefore, the degree of importance is calculated as, for example, 4/6×100=67%. In the operation, the characteristic words and phrases may be sorted in a descending order of frequency of appearances for each component. For a characteristic word/phrase of a predetermined sequential position and characteristic words and phrases following the characteristic word/phrase, the degree of importance is regarded as lower importance although cooccurrence exists for the respective components, and hence these characteristic words and phrases are not taken into consideration when the frequency of appearances is counted. Additionally, for example, for characteristic words and phrases of which the frequency of appearances in the newspaper items published in "July" is less than a predetermined value, it may be considered that cooccurrence does not exist with "July", and hence these characteristic words and phrases are not taken into consideration when the frequency of appearances is counted.

In step 901, any characteristic word/phrase with the degree of importance (step 900) exceeding a predetermined value is extracted as a multiple cooccurrence word/phrase.

Figure 11:
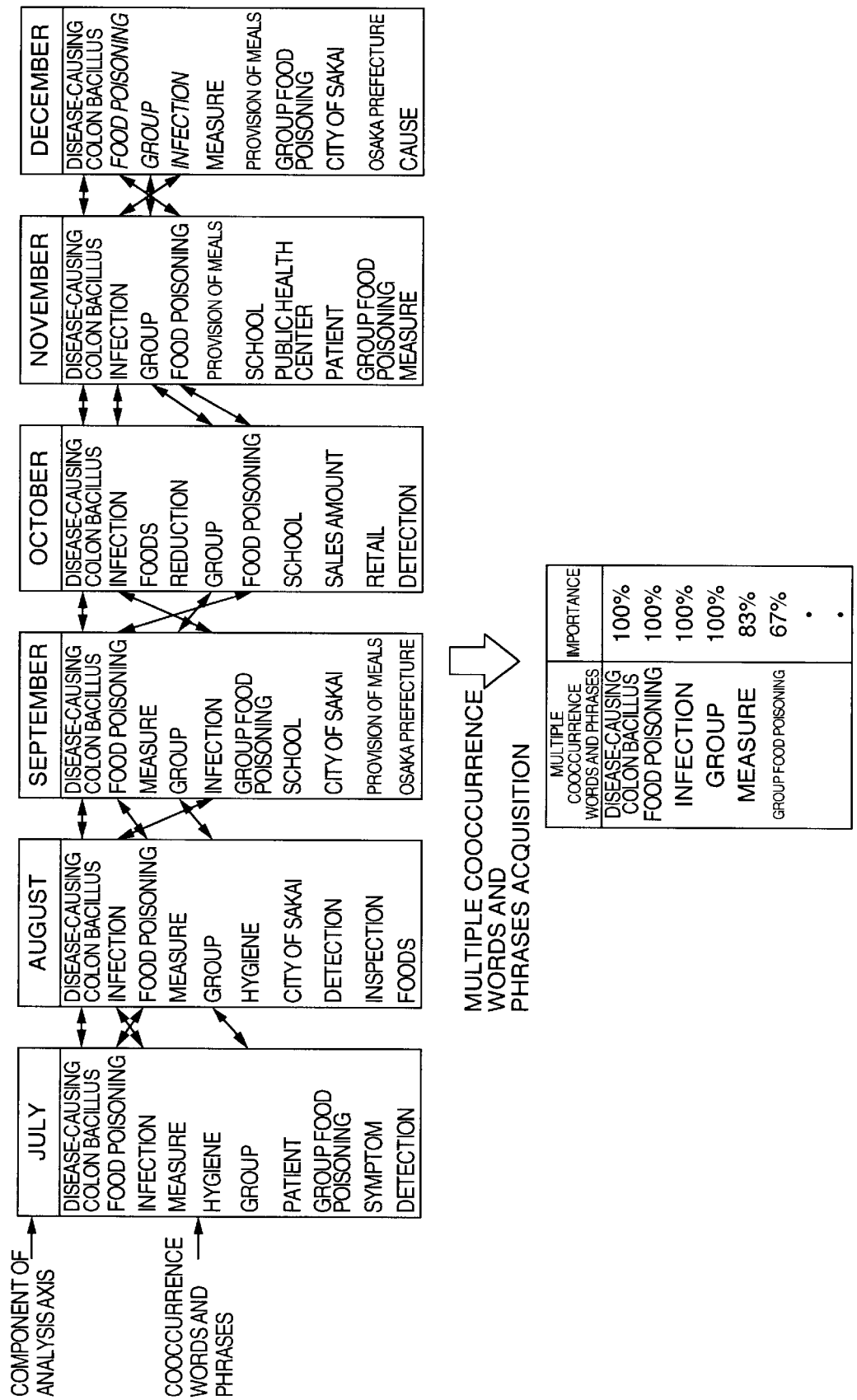
FIG. 11 is a diagram showing the contents of multiple cooccurrence words and phrases acquisition processing in an embodiment of the present invention.

FIG. 11 shows an example of multiple cooccurrence words and phrases acquisition. In the example of FIG. 11, multiple cooccurrence words and phrases are acquired from ten higher characteristic words and phrases with respect to the frequency of cooccurrence selected from the characteristic words and phrases cooccurring with the respective components of the analysis axis shown in FIG. 10. Assume that the threshold value is set to "50%". For example, words and phrases "disease-causing colon bacillus", "food poisoning", "infection", and "group" cooccur with all components of the analysis axis in a range from "July" to "December". Therefore, for these words and phrases, the degree of importance is calculated as 100%. This consequently exceeds the threshold value "50%", and hence these words and phrases are obtained as multiple cooccurrence words and phrases. The word "measure" cooccurs with five components excepting "October" among six components. Therefore, the degree of importance thereof is calculated as 83%. This consequently exceeds the threshold value "50%", and hence the word "measure" is obtained as one of the multiple cooccurrence words and phrases.

Figure 12:
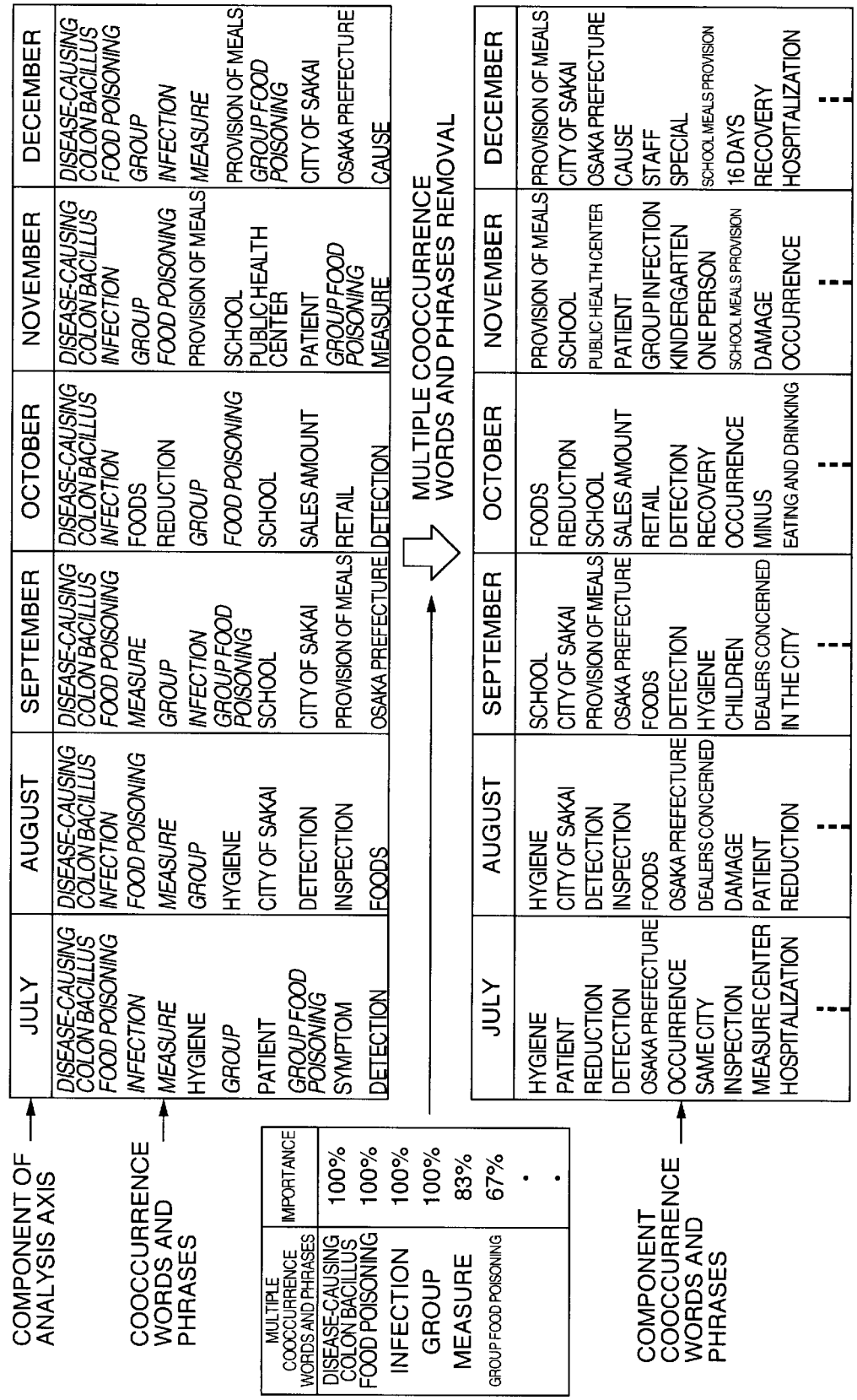
FIG. 12 is a diagram showing the contents of multiple cooccurrence words and phrases removal processing in an embodiment of the present invention.

In step 902, the multiple cooccurrence words and phrases removal program 117 is initiated to repeatedly execute processing of step 903 for the components of the analysis axis. In step 903, the multiple cooccurrence words and phrases obtained in step 901 are removed from the cooccurrence words and phrases of the pertinent component to thereby create component-cooccurrence words and phrases. FIG. 12 shows an example of the removal of multiple cooccurrence words and phrases. In the example of FIG. 12, "disease-causing colon bacillus", "food poisoning", "infection", "group", etc. obtained as multiple cooccurrence words and phrases are removed from the cooccurrence words and phrases of the respective components to create component-cooccurrence words and phrases.

As can be seen from FIG. 6, when presenting the results of the operation above to the user, the multiple cooccurrence words and phrases may be displayed as similar topics of the components of the analysis axis and the component-cooccurrence words and phrases are displayed as topics of the respective components. In FIG. 6, the value indicated as a degree of importance is a degree of depth or strength of a relationship represented by the number of related components. It may also be possible to relax the restriction of cooccurrence words and phrases to be obtained as multiple cooccurrence words and phrases such that cooccurrence words and phrases with a lower degree of importance are extracted as multiple cooccurrence words and phrases. Resultantly, cooccurrence words and phrases unique to the respective components are obtained as the component-cooccurrence words and phrases. Therefore, it is possible to present topics unique to the respective components to the user. Moreover, the system may be configured such that the user can make a selection on a screen to display either one of or both of the multiple cooccurrence words and phrases and the component-cooccurrence words and phrases as results of the operation. It is also possible that the user can specify on a screen a threshold value of the degree of importance for the cooccurrence words and phrases to be extracted as the multiple cooccurrence words and phrases.

Description has been given in detail of the contents of processing executed by the embodiment. In the method of the embodiment described above, the cooccurrence words and phrases are compared between the components of the analysis axis to obtain, as multiple cooccurrence words and phrases, cooccurrence words and phrases related with many components. Thereafter, component-cooccurrence words and phrases are generated by removing the multiple cooccurrence words and phrases from the cooccurrence words and phrases of the respective components. Therefore, similar points of the respective components of the analysis axis can be presented as the multiple cooccurrence words and phrases to the user, and distinguishing features thereof can be presented as the component-cooccurrence words and phrases to the user. That is, there is implemented a text mining function which can clearly present the results analysis to the user as above. Consequently, it is possible to provide a document processing system in which the user can appropriately analyze a tendency of a set of documents.

In the description of the embodiment, a full text search is used to selectively create a set of documents. However, the similar processing is possible in a case in which the overall set of documents stored in the database is specified as the objective document set or in which a text or a document is used as a search condition to set a result of the search as the objective document set.

In the description of the example of the embodiment, specified bibliographical information is set as the analysis axis for the text mining operation. However, the similar processing is possible also when specified words and phrases are set as components of the analysis axis for the text mining operation. In this situation, characteristic words and phrases extracted from the objective document set are presented to the user. The user selects components from the presented words and phrases or inputs particular words and phrases from the keyboard.

The specification and drawings are, accordingly, to be regarded in an illustrative rather than a restrictive sense. it will, however, be evident that various modifications and changes may be made thereto without departing from the broader spirit and scope of the invention as set forth in the claims.

What is claimed is:

1. A text mining method, comprising:
   a characteristic words and phrases extraction step of selecting, from a set of documents, all of or part of the documents as an objective document set and extracting, from the objective document set, words and phrases characteristically appearing in the objective document set;
   a mining scheme creation step of setting a mining scheme including specified components;
   a related words and phrases extraction step of acquiring, from the words and phrases extracted by said characteristic words and phrases extraction step, related words and phrases selected when the relativity thereof calculated according to a predetermined calculation formula exceeds a predetermined value with respect to the respective specified components included in the mining scheme;
   a multiple related words and phrases extraction step of comparing the related words and phrases between the respective components included in the mining scheme and extracting, as multiple related words and phrases, those related words and phrases related to many components included in the mining scheme; and
   a multiple related words and phrases removing step of removing said extracted multiple related words and phrases to create component-related words and phrases.

2. A text mining method according to claim 1, wherein:
   said related words and phrases selected when the relativity thereof calculated according to the predetermined calculation formula exceeds a predetermined value with respect to the respective specified components included in the mining scheme, are coincident words and phrases occurring together in a predetermined range with the respective specified components included in the mining scheme;
   said related words and phrases extraction step includes a coincident words and phrases acquisition step of obtaining, from the words and phrases extracted by said characteristic words and phrases extraction step, coincident words and phrases occurring together in a predetermined range with the respective specified components included in the mining scheme; and
   said multiple related words and phrases extraction step includes a multiple coincident words and phrases extraction step of comparing the coincident words and phrases between the respective components included in the mining scheme and of extracting, as multiple coincident words and phrases, coincident words and phrases related to many components included in the mining scheme.

3. A text mining method according to claim 1, wherein the objective document set is a document set obtained by conducting a retrieval by using a word/phrase, a statement, or a document as a retrieval condition.

4. A text mining method according to claim 2, wherein said multiple related words and phrases extraction step includes:
   a multiple coincident words and phrases acquisition step of comparing the coincident words and phrases between the respective components included in the mining scheme and of extracting, as multiple coincident words and phrases, coincident words and phrases related to many components included in the mining scheme.

5. A text mining method according to claim 4, wherein the coincident words and phrases related to many components included in the mining scheme are words and phrases extracted as coincident words and phrases for at least a predetermined number of components.

6. A text mining method according to claim 4, wherein the coincident words and phrases related to many components included in the mining scheme are words and phrases extracted as coincident words and phrases having a value exceeding a predetermined value, the value being calculated according to strength of coincidence of the coincident words and phrases with each of the components included in the mining scheme and the number of the coincident components.

7. A text mining method according to claim 5, wherein said multiple coincident words and phrases acquisition step includes an importance calculation step for calculating multiple coincident words and phrases according to a predetermined calculation formula.

8. A text mining method according to claim 6, wherein said multiple coincident words and phrases acquisition step includes an importance calculation step for calculating multiple coincident words and phrases according to a predetermined calculation formula.

9. A text mining method according to claim 7, wherein the importance calculation step is performed according to a predetermined calculation formula using the number of the components associated with the multiple coincident words and phrases.

10. A text mining method according to claim 8, wherein the importance calculation step is performed according to a predetermined calculation formula using strength of coincidence of the multiple coincident words and phrases with each of the components included in the mining scheme and the number of the coincident components.

11. A text mining method according to claim 1, further comprising a related words and phrases indication step of indicating the multiple related words and phrases obtained by said multiple related words and phrases acquisition step and the component-related words and phrases obtained by the multiple related words and phrases removing step.

12. A text mining method according to claim 4, further comprising a coincident words and phrases indication step of indicating the multiple coincident words and phrases obtained by said multiple coincident words and phrases acquisition step and the component-related words and phrases obtained by the multiple related words and phrases removing step.

13. A text mining method according to claim 7, further comprising a coincident words and phrases indication step of indicating the multiple coincident words and phrases and the importance obtained by said multiple coincident words and phrases acquisition step and the component-related words and phrases obtained by the multiple related words and phrases removing step.

14. A text mining apparatus, comprising:
characteristic words and phrases extraction means for selecting, from a set of documents, all of or part of the documents as an objective document set and for extracting, from the objective document set, words and phrases characteristically appearing in the objective document set;
mining scheme creation means for setting a mining scheme including specified components;
related words and phrases extraction means for obtaining, from the words and phrases extracted by said characteristic words and phrases extraction means, related words and phrases selected when the relativity thereof calculated according to a predetermined calculation formula exceeds a predetermined value with respect to the respective specified components included in the mining scheme;
multiple related words and phrases extraction means for comparing the related words and phrases between the respective components included in the mining scheme and of extracting, as multiple related words and phrases, related words and phrases related to many components included in the mining scheme; and
multiple related words and phrases removing means for removing said extracted multiple related words and phrases to create component-related words and phrases.

15. A storing medium having stored thereon a program to configured thereon a text mining system, wherein the text mining system comprises:
a characteristic words and phrases extraction module for selecting, from a set of documents, all of or part of the documents as an objective document set and for extracting, from the objective document set, words and phrases characteristically appearing in the objective document set;
a mining scheme creation module for setting a mining scheme including specified components;
a related words and phrases extraction module for obtaining, from the words and phrases extracted by said characteristic words and phrases extraction module, related words and phrases selected when the relativity thereof calculated according to a predetermined calculation formula exceeds a predetermined value with respect to the respective specified components included in the mining scheme;
a multiple related words and phrases extraction module for comparing the related words and phrases between the respective components included in the mining scheme and of extracting, as multiple related words and phrases, related words and phrases related to many components included in the mining scheme; and
a multiple related words and phrases removing means for removing said extracted multiple related words and phrases to create component-related words and phrases.

16. A computer-executable program for implementing a text mining method using a computer, wherein said text mining method comprises the steps of:
selecting, from a set of documents, all of or part of the documents as an objective document set and extracting, from the objective document set, words and phrases characteristically appearing in the objective document set;
setting a mining scheme including specified components;
acquiring from the words and phrases extracted by said characteristic words and phrases extraction step, related words and phrases selected when the relativity thereof calculated according to a predetermined calculation formula exceeds a predetermined value with respect to the respective specified components included in the mining scheme;
comparing the related words and phrases between the respective components included in the mining scheme and extracting, as multiple related words and phrases, related words and phrases related to many components included in the mining scheme; and
a multiple related words and phrases removing step of removing said extracted multiple related words and phrases to create component-related words and phrases.

17. A text-mining oriented data structure including multiple related words and phrases generated from a document set, said multiple related words and phrases being determined by those related to more than a designated number of components included in a mining scheme, said data structure being created by implementing the steps of:
selecting, from a set of documents, all of or part of the documents as an objective document set and extracting, from the objective document set, words and phrases characteristically appearing in the objective document set;

setting a mining scheme including specified components;

acquiring from the words and phrases extracted by said characteristic words and phrases extraction step, related words and phrases selected when the relativity thereof calculated according to a predetermined calculation formula exceeds a predetermined value with respect to the respective specified components included in the mining scheme;

comparing the related words and phrases between the respective components included in the mining scheme to generate a set of multiple related words and phrases; and a multiple related words and phrases removing step of removing said extracted multiple related words and phrases to create component-related words and phrases.

18. A text mining method, comprising:

selecting, from a set of documents, all of or part of the documents as an objective document set; and extracting, from the objective document set, words and phrases characteristically appearing in the objective document set;

setting a mining scheme including specified components of an analysis axis;

acquiring, from the words and phrases extracted by said characteristic words and phrases extraction step, related words and phrases selected when the relativity thereof calculated according to a predetermined calculation formula exceeds a predetermined value with respect to the respective specified components of the analysis axis, said acquiring being performed so as to maintain a relation between each component and each acquired word and phrase;

comparing to each other the related words and phrases related to the respective components of the analysis axis in the acquiring step;

extracting, as multiple related words and phrases, those related words and phrases related to many components of the analysis axis; and removing said extracted multiple related words and phrases to create component-related words and phrases while maintaining the relation between each component and each word and phrase not removed in said removing step.

19. A text mining method according to claim 18, wherein said components of the analysis axis constitute at least part of a time domain.

20. A text mining method according to claim 19, wherein said components are months in said time domain.

21. A text mining apparatus, comprising:

characteristic words and phrases extraction means for selecting, from a set of documents, all of or part of the documents as an objective document set and for extracting, from the objective document set, words and phrases characteristically appearing in the objective document set;

mining scheme creation means for setting a mining scheme including specified components of an analysis axis;

related words and phrases extraction means for obtaining, from the words and phrases extracted by said characteristic words and phrases extraction means, related words and phrases selected when the relativity thereof calculated according to a predetermined calculation formula exceeds a predetermined value with respect to the respective specified components included in the mining scheme of the analysis axis, said words and phrases being obtained so as to maintain a relation between each component and each obtained word and phrase;

multiple related words and phrases extraction means for comparing to each other the related words and phrases related to the respective components of the analysis axis and for extracting, as multiple related words and phrases, related words and phrases related to many components of the analysis axis; and multiple related words and phrases removing means for removing said extracted multiple related words and phrases to create component-related words and phrases while maintaining the relation between each component and each word and phrase not removed by said multiple related words and phrases removing means.

22. A text mining apparatus according to claim 21, wherein said components of the analysis axis constitute at least part of a time domain.

23. A text mining apparatus according to claim 22, wherein said components are months in said time domain.

* * * * *